United States Patent
Picard et al.

(10) Patent No.: US 11,037,314 B1
(45) Date of Patent: Jun. 15, 2021

(54) METHOD FOR THE NON-DESTRUCTIVE INSPECTION OF AN AERONAUTICAL PART AND SYSTEM THEREOF

(71) Applicant: SAFRAN, Paris (FR)

(72) Inventors: Sylvaine Picard, Moissy-Cramayel (FR); Yann Le Guilloux, Moissy-Cramayel (FR)

(73) Assignee: SAFRAN, Paris (FR)

( * ) Notice: Subject to any disclaimer, the term of this patent is extended or adjusted under 35 U.S.C. 154(b) by 9 days.

(21) Appl. No.: 16/635,841

(22) PCT Filed: Aug. 3, 2018

(86) PCT No.: PCT/FR2018/052017
§ 371 (c)(1),
(2) Date: Jan. 31, 2020

(87) PCT Pub. No.: WO2019/025745
PCT Pub. Date: Feb. 7, 2019

(30) Foreign Application Priority Data

Aug. 3, 2017 (FR) ...................................... 1757490

(51) Int. Cl.
*G01B 11/25* (2006.01)
*G06T 7/521* (2017.01)
*H04N 13/254* (2018.01)
*G06T 7/586* (2017.01)

(52) U.S. Cl.
CPC .............. *G06T 7/521* (2017.01); *G06T 7/586* (2017.01); *H04N 13/254* (2018.05); *G06T 2207/10012* (2013.01); *G06T 2207/10152* (2013.01); *G06T 2207/20221* (2013.01)

(58) Field of Classification Search
CPC ..................... G06T 7/521; G06T 7/586; G06T 2207/10152; G06T 2207/10012; G06T 2207/20221
See application file for complete search history.

(56) References Cited

U.S. PATENT DOCUMENTS

| 7,315,383 B1 * | 1/2008 | Abdollahi | .......... | G01B 11/0608 356/601 |
| 9,082,185 B2 * | 7/2015 | Sonoda | ................... | G06T 7/521 |

(Continued)

OTHER PUBLICATIONS

Sun et al: 'Object surface recovery using a multi-light photometric stereo technique for non-Lambertian surfaces subject to shadows and specularities', Image A'-JD Vision Computing, Elsevier, Guildford, GB, vol. 25, No. 7, May 6, 2007 (May 6, 2007), pp. 1050-1057,XP022062607 (Year: 2007).*

(Continued)

*Primary Examiner* — Howard D Brown, Jr.
(74) *Attorney, Agent, or Firm* — Sughrue Mion, PLLC

(57) ABSTRACT

The invention relates to a method for the non-destructive inspection of an aeronautical part, by means of acquiring stereoscopic images and determining a three-dimensional model of the part, characterised in that it is used to extinguish one or more portions of the lighting of the part, and subsequently acquire a stereoscopic image of the surface by each of the sensors, these steps being performed by projecting a light on the surface by means of at least two projectors positioned in different locations.

7 Claims, 4 Drawing Sheets

(56) References Cited

U.S. PATENT DOCUMENTS

| | | | | |
|---|---|---|---|---|
| 2008/0063260 A1* | 3/2008 | Lin | ................... | G01B 11/2509 382/154 |
| 2013/0156268 A1* | 6/2013 | Sonoda | ................... | G06F 11/10 382/106 |
| 2013/0287288 A1* | 10/2013 | Bendall | ................ | G06T 7/0004 382/154 |
| 2014/0002610 A1* | 1/2014 | Xi | ...................... | G01B 11/2545 348/46 |
| 2014/0078490 A1* | 3/2014 | Higo | ..................... | G01B 11/25 356/4.01 |
| 2016/0078610 A1* | 3/2016 | Rudd | ................... | G06T 7/0004 348/87 |

OTHER PUBLICATIONS

Dinkar N. Bhat et al., "Stereo and Specular Reflection", International Journal of Computer Vision, 1998, pp. 91-106, vol. 26, No. 2.

Jiuai Sun et al., "Object surface recovery using a multi-light photometric stereo technique for non-Lambertian surfaces subject to shadows and specularities", Image and vision Computing, 2007, pp. 1050-1057, vol. 25.

International Search report for PCT/FR2018/052017 dated Nov. 6, 2018 (PCT/ISA/210).

Search Report dated Nov. 22, 2017 from the Institut National de la Propriete Industrielle from the French Patent Office in application No. 1757490.

* cited by examiner

METHOD FOR THE NON-DESTRUCTIVE INSPECTION OF AN AERONAUTICAL PART AND SYSTEM THEREOF

CROSS REFERENCE TO RELATED APPLICATIONS

This application is a National Stage of International Application No. PCT/FR2018/052017 filed Aug. 3, 2018, claiming priority based on French Patent Application No. 1757490, filed Aug. 3, 2017, the entire contents of each of which are herein incorporated by reference in their entireties.

FIELD OF THE INVENTION

The invention relates to a method for the non-destructive inspection of an aeronautical part, by acquisition of stereoscopic images and determination of a three-dimensional model of the part, as well as to a system for acquiring this type of images and inspecting such an aeronautical part.

STATE OF THE ART

The three-dimensional measurement of a surface is typically carried out by contact. The surface of a part, fixed on a measuring table, is traveled by a measuring head, making it possible to acquire the spatial coordinates of the surface of the part. This method is particularly invasive and the speed of acquisition of the spatial data is limited by the travel time of the measuring head on the surface.

For this purpose, it is known to acquire a three-dimensional image of a part without contact through stereoscopy. During a stereoscopic measurement, two images of the surface are produced by two optical sensors at two different locations of the space. It is thus possible to reconstruct the three-dimensional structure of the surface by comparing the two images.

In order to facilitate the reconstruction of the surface in three dimensions, it is also known to use a structured light projection method. This method consists of projecting a known light pattern onto the surface of the part to be measured, then imaging the surface with one or several optical sensor(s). The structure of the surface is then calculated by comparing the original pattern with the pattern diffused by the surface, then imaged by each of the sensors, or by comparing the imaged patterns with each other. This method can be implemented only if the reflection of the pattern on the surface of the measured part is a diffusive (or Lambertian) reflection: the reflected luminance is the same in all the directions of the half-space delimited by the surface. Thus, light rays emitted by one point on the surface can reach all the sensors, which makes it possible to associate a pixel of each of the sensors with the same point on the surface.

This measurement method is not suitable for measuring surfaces causing specular reflections, that is to say when a ray incident on the surface is reflected along a single direction, or more generally along a preferred direction. In this case, the images acquired by the two sensors are not reliably and accurately matchable. Moreover, the matchings between specular reflections lead to an erroneous reconstruction because these reflections do not generally correspond to the same point on the surface.

For this purpose, it is known to matify the surface before carrying out a stereoscopic measurement thereof. The matifying of a surface consists of depositing a powder on the surface to be measured, the powder causing diffusive or Lambertian reflection properties on the surface.

The deposition of the powder is long and expensive. In addition, the thickness of the powder layer on the surface to be measured introduces a bias in the measurement.

It is also known for this purpose to light the part with several projectors. Sun et al. (Sun, J., Smith, M., Smith, L., Midha, S., & Bamber, J. (2007), *Object surface recovery using a multi-light photometric stereo technique for non-Lambertian surfaces subject to shadows and specularities*, Image and Vision Computing, 25(7), 1050-1057) describes the determination of a three-dimensional model of a part through stereoscopy, in which stereoscopic images are acquired with different lightings of the part. Thus, it is possible to acquire stereoscopic images presenting different locations of the specularities. The specularities can be digitally erased. However, the accuracy of this method may be limited, and the implementation of this method requires six lighting sources, the installation and inspection of which can be complex.

SUMMARY OF THE INVENTION

An object of the invention is to propose a solution to be able to acquire stereoscopic images, making it possible to determine a three-dimensional model of an aeronautical part, without direct mechanical contact with the surface and without matifying step.

Particularly, one object of the invention is a method for non-destructive inspection of an aeronautical part, by acquisition of stereoscopic images and determination of a three-dimensional model of the part, the part being delimited by a surface, said method implementing:

a) a projection of a lighting onto the surface by a first projector;

b) an acquisition of a stereoscopic image of the surface by a first sensor and by a second sensor that are arranged in two different locations;

c) a detection of one or several specularity/specularities on each of the images of the sensors;

the method being characterized in that it implements:

d) an extinction of one or several portion(s) of the lighting causing the specularity/specularities in the direction of the sensor(s); then e) an acquisition of a stereoscopic image of the surface by each of the sensors;

the operations a) to e) also being carried out by projecting a lighting onto the surface by a second projector, the second projector being arranged at a location different from the first projector; the method implementing a determination of the three-dimensional model of the part from the stereoscopic images obtained during the acquisition e) under lighting of the first projector and stereoscopic images obtained during the acquisition under lighting of the second projector, a first three-dimensional model of the part being determined from the images obtained during an acquisition e) under lighting of the first projector, a second three-dimensional model of the part being determined from the images obtained during an acquisition e) under lighting of the second projector, and a third three-dimensional model of the part being determined by fusion of the first model and the second model.

It is understood that with such a method, it is possible to acquire stereoscopic images and to determine a model of a part whose surface comprises specularities, in a non-invasive manner, without interaction with the part (differently from known measurement methods, with a probe or a powder).

The invention is advantageously completed by the following characteristics, taken individually or in any of their technically possible combinations:

- during the acquisition e), projection of a lighting onto the surface by the second projector without simultaneous projection of a lighting by the first projector;
- during the determination of the three-dimensional model, fusion of the images of the first sensor that are acquired under different lightings after extinction d), fusion of the images of the second sensor that are acquired under different lightings after extinction d), and determination of the three-dimensional model of the part from the images thus obtained by fusion;
- determination of the portion(s) of the lighting to be turned off, during the extinction d), by:
- projecting a light pattern onto the surface by means of the first projector and/or the second projector;
- associating the image of a light pattern on the surface and the projected light pattern;
- turning off one or several portion(s) of a projector that are associated with one or several portion(s) of the image of the light pattern corresponding to one or several specularity/specularities;
- determination of the portion(s) of the lighting to be turned off by:
- projecting a sequence of light patterns, each light pattern of the sequence comprising several portions of binary light intensities, the sequence of the intensities of each portion of light pattern making it possible to identify said portion of light pattern;
- filming the surface with a sensor during the projection of the sequence of light patterns, detecting a specularity and identifying one said portion of the lighting to be turned off by the sequence of one portion of the image of the sensor comprising the specularity;
- determination of a straight line normal to the surface at one point of a specular portion, by implementing:
- inspection of the part in a working space and wherein the first projector and the second projector are arranged so that, for each sensor and throughout the working space, the angle α of intersection of the ellipse having as foci the first projector and the sensor and of the ellipse having as foci the second projector and the sensor, is greater than 10°.

Another object of the invention is a system for non-destructive inspection of an aeronautical part, by determination of a three-dimensional model of said part, said part being delimited by a surface comprising a specular portion, the system comprising at least a first projector, a first sensor and a second sensor that are arranged at two different locations, and a control unit, characterized in that the system also comprises a second projector arranged at a location different from the first projector, and in that said control unit is configured to:

- control a lighting of the surface by the first projector and/or by the second projector;
- control the imaging of the surface by the first sensor and/or by the second sensor;
- detect one or several specularity/specularities on the images of the sensors;
- control the extinction of at least one portion of the lighting causing specularities in the direction of the sensor(s) by the first projector and/or by the second projector.

PRESENTATION OF THE FIGURES

Other characteristics and advantages will also emerge from the following description, which is purely illustrative and non-limiting, and should be read in relation to the appended figures, among which:

Figure 8:
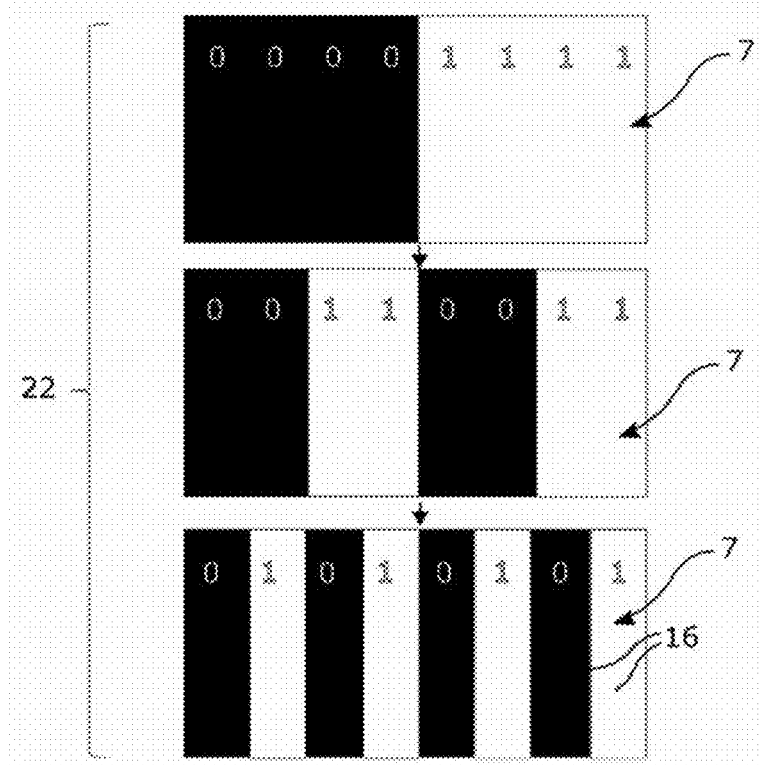
Figure 9:
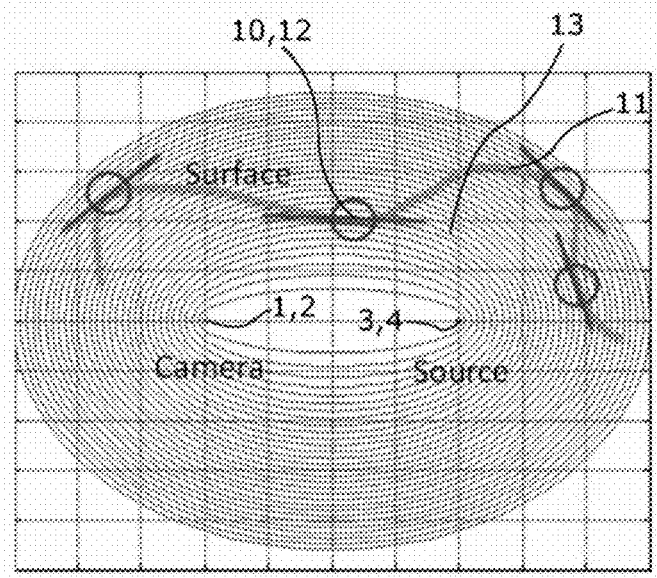
Figure 10:
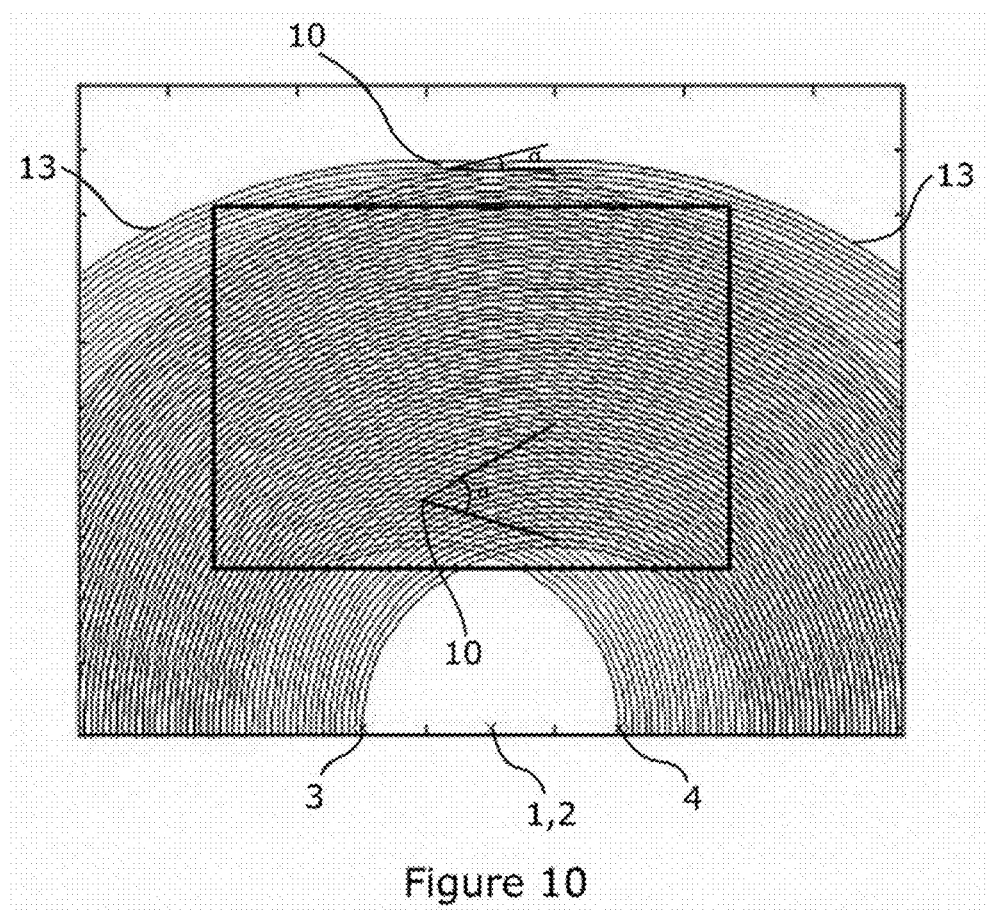

FIG. 8 schematically illustrates a light pattern in the form of a sequence;

FIG. 9 schematically illustrates the surface of a part, a sensor and a projector;

FIG. 10 schematically illustrates the surface of a part, a sensor and two projectors.

DEFINITIONS

The term "specular" refers to the ability of a surface to reflect an incident light ray along a preferred direction and more specifically a substantially unique direction, along the half-space delimited by the surface. In other words, the light of an incident ray is not or hardly diffused by a surface: a specular reflection is different from a diffuse or Lambertian reflection.

The term "specularity" refers to the specular reflection of a surface, at one point. It is directed in the preferred direction of reflection of the incident light ray.

The term "image fusion" refers to an image processing, taking into account the information coming from several input images, and producing one data or a set of data comprising more information than the input images considered individually.

The term "angle of intersection of two conics", particularly "of two ellipses", at one point common to the two conics, refers to the minimum angle formed by the straight lines tangent to the conics at this point.

DESCRIPTION OF THE INVENTION

Figure 1:
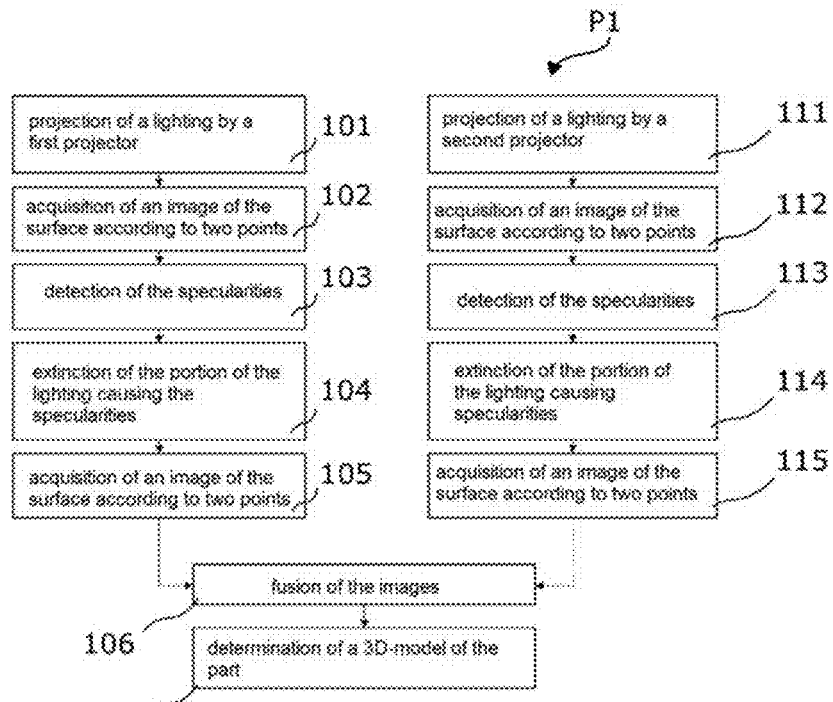
FIG. 1 illustrates a method for acquiring stereoscopic images and determining a three-dimensional model of a part.

FIG. 1 illustrates a method P1 for non-destructive inspection of an aeronautical part 5 and for determination of a three-dimensional model of the part 5. In one embodiment of the invention, the surface 11 of the considered part 5 comprises a specular portion 12. However, the acquisition of stereoscopic images, and the determination of a three-dimensional model of a part 5 is possible in the absence of specular reflection on the surface 11 of the part 5.

During a step 101 (illustrated in FIG. 3), the user can project a lighting 20 onto the surface 11 of a part 5, with a first projector 3. The lighting can advantageously implement the projection of a light pattern 7, or be a light pattern 7.

During step 102 (illustrated in FIG. 3), the acquisition of a stereoscopic image of the surface 11 of the part 5 is carried out by a first sensor 1 and by a second sensor 2. The sensors 1, 2 are arranged at different locations in the space. The sensors 1, 2 used can be standard photographic sensors, for example of the CCD, CMOS type, industrial cameras, or any other device forming a resolved image of the surface 11 observed.

Figure 3:
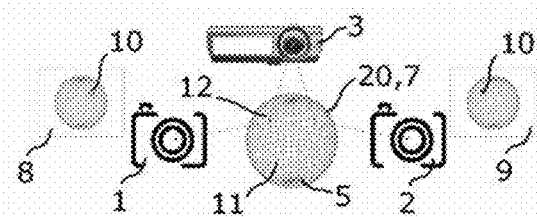
FIGS. 3 to 7 illustrate steps of a method for acquiring a stereoscopic image of a part.

An image 8 of a first sensor 1 is illustrated on the left of FIG. 3 and an image 9 of a second sensor 2 is illustrated on the right of FIG. 3. On each of these images, a specularity 10 is imaged. The two specularities 10 are illustrated by gray points. The specularity 10 of each of the images is different: in the image 8 of the first sensor 1, the specularity 10 observed corresponds to a specular portion 12 comprised in the left portion of the part 5 observed, and in the image 9 of the second sensor 2, the specularity 10 observed corresponds to a specular portion 12 comprised in the right portion of the part 5 observed.

During a step 103, the user and/or a control unit 17 detect the specularity/specularities 10 in each of the images of the sensors 1, 2 obtained during step 102 or 202. The specularities 10 can be detected in the image by the presence of local saturations of one or several neighboring pixels in the image. In general, the specularities 10 can be detected in post-processing, for example by segmentation of the images, by thresholding of the gray or color levels. The location of the specularities 10 in the image 8, 9 is directly dependent on the relative positions of the projector, of the surface 11 of the part 5 and of the sensor 1, 2.

Figure 4:
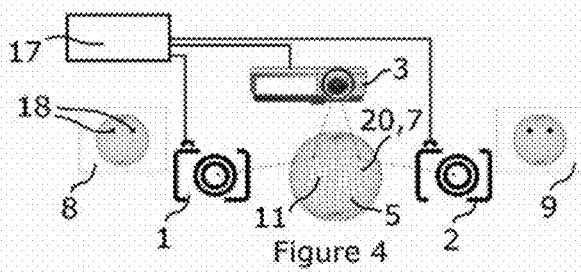

During a step 104, the user or a lighting control unit 17 can hide and/or turn off the portion(s) of the lighting 20 causing one or several specularity/specularities 10 on the surface 11 of the part 5 in the direction of the sensors 1, 2. FIG. 4 illustrates a first projector 3 projecting a lighting 20 onto the surface 11 of the part 5, in which the incident light rays, represented by arrows from the first projector 3 to the surface 11, are selectively turned off. A control unit 17 can be electrically connected to the first sensor 1 and to the second sensor 2 so as to load the data from the sensors 1, 2 towards the control unit 17. The portion(s) of the lighting projected by the first projector 3 causing the specularity/specularities 10 is/are calculated based on the images of the surface 11 by the sensors 1, 2. The control unit 17, electrically connected to the first projector 3, can thus inspect the operating state of one portion of the projected lighting, for example, by hiding or turning off the pixels corresponding to the specularities 10.

Thus, the specularities 10 of the surface 11 can be turned off. The localized extinction of the projector causes one or several local shadow areas 18 on the surface 11 in place of one or several portion(s) of the lighting 20. In this way, the surface can be lighted, at least partly, without causing specularity 10.

During a step 105 of the method (illustrated in FIG. 4), the acquisition of a stereoscopic image of the surface 11 of the part 5 is carried out by a first sensor 1 and by a second sensor 2. FIG. 4 illustrates an image 8 of a first sensor 1 and an image 9 of a second sensor 2, each comprising two shadow areas 18 on the surface 11. In the image 8 of the first sensor 1, on the left of FIG. 4, the shadow area 18 on the left corresponds to a turned off specularity 10, illustrated by the arrows on the right starting from the first projector 3, passing through the surface 11 up to the second sensor 2. The shadow area on the right corresponds to a turned off specularity 10 illustrated by the arrows on the left starting from the first projector 3, passing through the surface 11 up to the first sensor 1.

During steps 111, 112, 113, 114 and 115, steps 101, 102, 103, 104 and 105 are carried out by projecting in step 111 a lighting onto the surface 11 by a second projector 4, possibly without the first projector 3. The second projector 4 is arranged at a location different from the first projector 3, and can thus cause specularities 10 at other locations on the surface 11, or not cause specularity.

Figure 5:
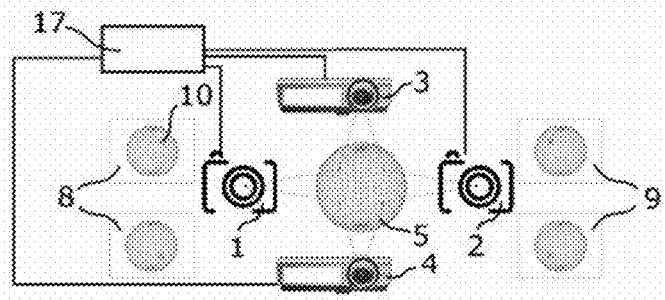

FIG. 5 illustrates a system comprising two projectors. The control unit 17, electrically connected to the second projector 4, can inspect the operating state of one portion of the projected lighting, for example by hiding or turning off the pixels corresponding to the specifics 10.

At the top left of FIG. 5, an image 8 of a first sensor 1, produced during a step 101, is illustrated. At the bottom left of FIG. 5, an image 8 of a first sensor 1, produced during a step 111, is illustrated. At the top right of FIG. 5, an image 9 of a second sensor 2, produced during a step 101, is illustrated. At the bottom right of the image 4, an image 9 of a second sensor 2, produced during a step 111, is illustrated.

On each of the four images 8, 9 of sensors 1, 2, illustrated in FIG. 5, different specularities 10 are imaged. Two specularities 10, caused by the first projector 3, are identical to the specularities 10 illustrated in FIG. 1. Two other specularities 10, caused by the second projector 4, are illustrated in the images 8, 9 of the first sensor 1 and of the second sensor 2, respectively at the bottom left and at the bottom right of FIG. 5.

Figure 6:
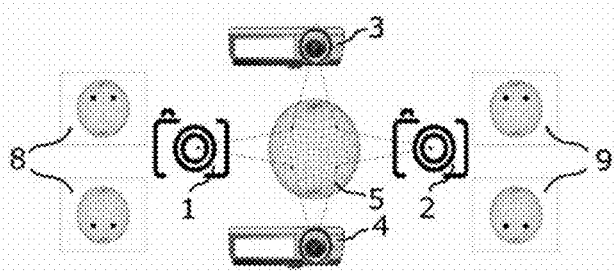

During steps 104 and 114, the specularities 10 are turned off by inspecting the first projector 3 and/or the second projector 4 with the control unit 17. Two images 8 of a first sensor 1 are illustrated in FIG. 6. The image at the top left corresponds to the image 8 of a first sensor 1 when the surface 11 is lighted by a first projector 3 and when the specularities 10 caused by the first projector 3 are turned off during a step 104. The image at the bottom left corresponds to the image 8 of a first sensor 1 when the surface 11 is lighted by a second projector 4 and when the specularities 10 caused by the second projector 4 are turned off during a step 114. The image on the top right corresponds to the image 9 of a second sensor 2 when the surface 11 is lighted by a first projector 3 and when the specularities 10 caused by the first projector 3 are turned off during a step 104. The image at the bottom right corresponds to the image 9 of a second sensor 2 when the surface 11 is lighted by a second projector 4 and when the specularities 10 caused by the first projector 3 are turned off during a step 114.

During a step 106 of the method (illustrated in FIG. 7), the images 8 of the first sensor 1 are fused into one image 19, and the images 9 of the second sensor 2 are also fused into one image 19. The fusion of several images of the same sensor 1, 2 that are produced during the projection of a lighting 20 by different projectors, makes it possible to eliminate the shadow areas 18 in a fused image. The fusion may comprise a step of selecting the pixel having the highest value between two same pixels of two images, for each of the pixels of the images.

Figure 7:
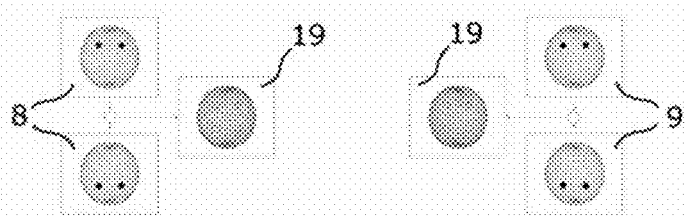

Step 106 is illustrated on the left of FIG. 7 by the fusion of an image 8 of the first sensor 1 during the projection of a lighting 20 by the first projector 3 and of an image 8 of the first sensor 1 during the projection of a lighting 20 by the second projector 4. The image resulting from the fusion does not include a shadow area. Step 106 is also illustrated on the right of FIG. 7 by the fusion of an image 9 of the second sensor 2 during the projection of a lighting 20 by the first projector 3 and of an image 9 of the second sensor 2 during the projection of a lighting 20 by the second projector 4. The image resulting from the fusion does not include a shadow area.

Two images are then obtained after the image fusion step 106: an image without shadow area or specularity, whose information comes from the first sensor 1 and an image without shadow area, or specularity, whose information comes from the second sensor 2. These two images form a stereoscopic pair without shadows or specularities.

During step 107 of the method, a three-dimensional model of the surface 11 is deduced from the stereoscopic pair. It is possible to use a known stereoscopy method by using the two images 19 obtained during the fusion step 106. These images are particularly suitable for use in stereoscopy because they do not include any shadow areas or specularities.

Figure 2:
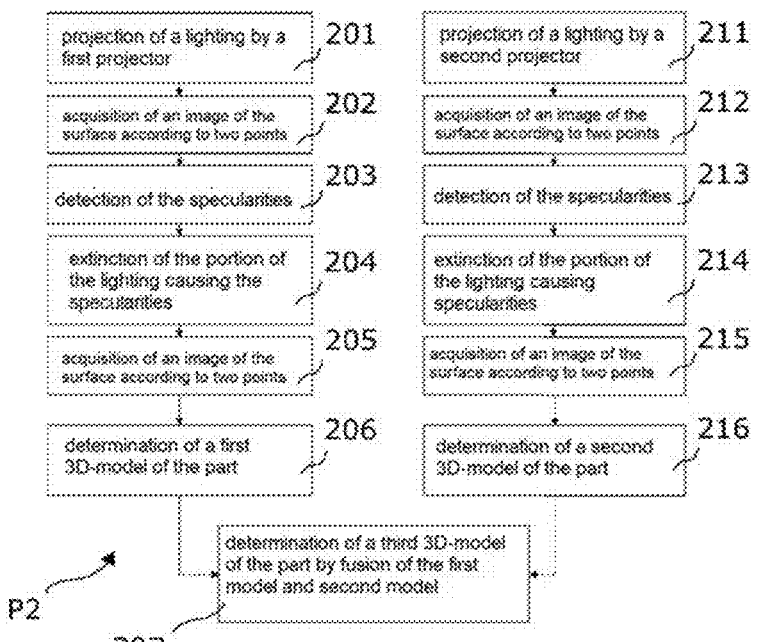
FIG. 2 illustrates a method for acquiring stereoscopic images and determining a three-dimensional model of a part.

FIG. 2 illustrates a method P2 for non-destructive inspection of an aeronautical part 5 and for determination of a three-dimensional model of the part 5. Steps 201 to 205 and 211 to 215 of the method P2 are respectively identical to steps 101 to 105 and 111 to 115 of the method P1.

During step 206 and 216, a first three-dimensional model of the part 5 is determined from the images acquired during a step 205 (from the images obtained during an acquisition under lighting of the first projector), and during step 216, a second three-dimensional model of the part 5 is determined from the images acquired during a step 215 (from the images obtained during an acquisition under lighting of the first projector).

Some areas of the surface 11 not being lighted, the images acquired by each of the sensors 1, 2 represent only partially the surface 11. During step 206, a first three-dimensional model of the part is determined from a pair of stereoscopic images acquired during step 205. This model can be determined by the control unit 17. In this model, information corresponding to the portions of the surface 11 that are not lighted by the first projector during step 205 is missing. During step 216, a second three-dimensional model of the part 5 is determined from a pair of stereoscopic images acquired during step 215. This model can be determined by the control unit 17. In this model, information corresponding to the portions of the surface 11 that are not lighted by the second projector in step 215, is missing.

During step 207, the first model and the second model obtained during steps 206 and 216, are fused so as to determine a third three-dimensional model of the part 5, more complete than the first and second models, comprising the information relating to the three-dimensional structure of the part 5 in the portions of the surface 11 that are not lighted during steps 205 and/or 215.

The specularities are turned off during steps 104, 114, 204 and/or 214. The portion(s) of the lighting 20 to be turned off during these steps are determined from the acquired images comprising specularities. It is possible to implement the projection of a light pattern 7 onto the part 5 during steps 102, 112, 202 and/or 212. It is for example possible to project a light pattern 7 onto the surface 11 by means of the first projector 3 and/or of the second projector 4 during the acquisition of an image by one of the sensors 1, 2. It is then possible to associate the image of the light pattern 7 on the surface 11 and the projected light pattern 7. Thus, it is possible to associate a pixel of the sensor(s) 1, 2 with a pixel of the projector(s) 3, 4. It is then possible to turn off one or several portion(s) of a projector 3, 4, for example a set of pixels of a projector 3, 4, associated with one or several portion(s) of the image of the light pattern 7 corresponding to one or several specularity/specularities 10.

FIG. 8 schematically illustrates a sequence 22 of light patterns 7. During step 104 and 114 of the method, the portion(s) of the lighting 20 causing one or several specularity/specularities 10 is/are hidden and/or turned off. The operating state (for example, turned off or turned on state) of one or several portion(s) of the projected lighting is calculated as a function of the images of the surface 11, produced by the sensors 1, 2. A user and/or the control unit 17 can determine the portion(s) of the lighting to be turned off and/or to be hidden by projecting a sequence 22 of light patterns 7. FIG. 8 illustrates a sequence of three light patterns 7, projected successively. The different portions 16 of a light pattern 7 correspond to the black or white columns of the pattern 7 at the bottom of the figure: eight portions 16 are represented. For each pattern 7 of the sequence, the light intensity of a projected portion 16 is binary, schematically represented in FIG. 8 by a black or white filling of each portion 16. In this example, each portion 16 of the pattern is binary coded along the sequence from 000 (portion completely on the left of the patterns 7 of the sequence) to 111 (portion completely on the right of the image of the sequence). In general, the projected sequence is different for each portion 16, which makes it possible to identify each of the portions 16. The binary coding presented here is given by way of example. There are various codings with interesting properties depending on the goal.

The surface 11 can be filmed by one or several sensor(s) 1, 2 during the projection of a sequence of light patterns 7. A user or a control unit 17 can determine a portion of the lighting to be turned off and/or to be hidden by detecting a specularity, then by identifying the sequence emitted by a portion of the filmed image comprising the specularity. The sequence of this portion of the image can be read and translated by the control unit 17 so as to identify the portion of the lighting to be turned off and/or hidden. The portions 16 can for example be pixels or pixel groups of a projector.

FIG. 9 schematically illustrates an installation comprising the surface 11 of a part 5, a sensor 1, 2 and a projector 3, 4.

During a specular reflection directed towards a sensor 1, 2, the straight line normal to the surface 11 at the point causing the specular reflection is aligned with the bisector of the angle formed by the direction of the incident ray and that of the reflected ray (in application of the Snell-Descartes law).

Furthermore, the normal straight line at one point of an ellipse 13 coincides with the bisector of the angle formed by a focus of the ellipse 13, said point and the second focus of the ellipse 13.

Thanks to this property, it is knows how to establish a quite simple criterion determining whether a surface element 11 can produce a specular reflection for a given projector-sensor configuration: $P_1$ and $P_2$ being the respective optical centers of the projector and of the sensor, M being a point on surface 11, a specular reflection is possible if the ellipse having as foci $P_1$ and $P_2$ and passing through M is tangent to the surface 11 at M. FIG. 9 illustrates, in a plane comprising the optical centers $P_1$ and $P_2$, the only points on the surface suitable for presenting a specular reflection. These are the points for which the local ellipse is tangent to the surface.

FIG. 10 illustrates a system comprising a sensor 1 and several projectors 3, 4. In general, the second projector 4 is arranged in the space so that no point on the surface 11 has a specular reflection caused by both the first projector 3 and the second projector 4.

Thus, if the lighting 20 of the first projector 3 causes on the sensor 1 a specular reflection at one point on the surface 11, the portion of the surface 11 at this point is tangent to the ellipse 13 having as foci the center of the projector 3 and the center of the sensor 1. This ellipse therefore forms a sufficient angle, at this point, with the ellipse having as foci the projector 4 and the center of the sensor 1, and the lighting 20 of the second projector 4 therefore cannot cause specular reflection on the sensor 1.

When two sensors 1 and 2 are implemented, the projectors 3, 4 and the sensors 1, 2 can be arranged so that, for each sensor, the angle α of intersection of the ellipse 13 having as foci the first projector 3 and the sensor and of the ellipse 13 having as foci the second projector 4 and the sensor, is sufficient, that is to say greater than 10°, throughout the working space in which the part 5 is inspected. Thus, no area of the working space is likely to cause, on a sensor 1, 2, two specular reflections when it is successively lighted by the projector 3 and by the projector 4. During the inspection of a part 5, any portion of the part is therefore lighted by at least one of the projectors, despite the required extinctions.

The invention claimed is:

1. A method (P1, P2) for non-destructive inspection of an aeronautical part (5), by acquisition of stereoscopic images and determination of a three-dimensional model of the part (5), the part (5) being delimited by a surface (11), said method implementing:
   a) a projection of a lighting (20) onto the surface (11) by a first projector (3);
   b) an acquisition of a stereoscopic image of the surface by a first sensor (1) and by a second sensor (2) that are arranged in two different locations;
   c) a detection of one or several specularity/specularities (10) on each of the images of the sensors;
   the method being characterized in that it implements:
   d) an extinction of one or several portion(s) of the lighting (20) causing the specularity/specularities in the direction of the sensor(s); then
   e) an acquisition of a stereoscopic image of the surface by each of the sensors (1,2);
   the operations a) to e) also being carried out by projecting a lighting (20) onto the surface by a second projector (4), the second projector being arranged at a location different from the first projector; the method implementing a determination of the three-dimensional model of the part (5) from the stereoscopic images obtained during the acquisition e) under lighting of the first projector (3) and stereoscopic images obtained during the acquisition e) under lighting of the second projector (4), a first three dimensional model of the part (5) being determined from the images obtained during an acquisition e) under lighting of the first projector (3), a second three-dimensional model of the part (5) being determined from the images obtained during an acquisition e) under lighting of the second projector (4), and a third three-dimensional model of the part (5) being determined by fusion of the first model and the second model.

2. The method (P1, P2) according to claim 1, wherein there is, during the acquisition e), projection of a lighting (20) onto the surface by the second projector (4) without simultaneous projection of a lighting by the first projector (3).

3. The method (P1) according to claim 1, wherein there are, during the determination of the three-dimensional model, fusion of the images of the first sensor (1) that are acquired under different lightings after extinction d), fusion of the images of the second sensor (2) that are acquired under different lightings after extinction d), and determination of the three-dimensional model of the part (5) from the images thus obtained by fusion.

4. The method (P1, P2) according to claim 1, wherein there is determination of the portion(s) of the lighting (20) to be turned off, during the extinction d), by:
   projecting a light pattern (7) onto the surface (11) by means of the first projector (3) and/or the second projector (4);
   associating the image of a light pattern on the surface (11) and the projected light pattern (7);
   turning off one or several portion(s) of a projector (3, 4) that are associated with one or several portion(s) of the image of the light pattern (7) corresponding to one or several specularity/specularities (10).

5. The method (P1, P2) according to claim 1, wherein there is determination of the portion(s) of the lighting (20) to be turned off by:
   projecting a sequence (15) of light patterns (7), each light pattern of the sequence (15) comprising several portions of binary light intensities, the sequence of the intensities of each portion of light pattern making it possible to identify said portion of light pattern (7);
   filming the surface (11) with a sensor (1, 2) during the projection of the sequence of light patterns (7), detecting a specularity and identifying one said portion of the lighting to be turned off by the sequence of one portion of the image of the sensor comprising the specularity.

6. The method (P1, P2) according to claim 1, wherein there is inspection of the part (5) in a working space and wherein the first projector (3) and the second projector (4) are arranged so that, for each sensor (1, 2) and throughout the working space, the angle α of intersection of the ellipse (13) having as foci the first projector (3) and the sensor (1, 2) and of the ellipse (13) having as foci the second projector (4) and the sensor (1,2), is greater than 10°.

7. A system for non-destructive inspection of an aeronautical part (5), by determination of a three-dimensional model of said part (5), said part (5) being delimited by a surface (11) comprising a specular portion (12), the system comprising at least a first projector (3), a first sensor (1) and a second sensor (2) that are arranged at two different locations, and a control unit (17), characterized in that the system also comprises a second projector (4) arranged at a location different from the first projector, and in that said control unit (17) is configured to:
   control a lighting (20) of the surface (11) by the first projector (3) and/or by the second projector (4);
   control the acquisition of a stereoscopic image of the surface by the first sensor (1) and/or by the second sensor (2);
   detect one or several specularity/specularities (10) on the images of the sensors;
   control the extinction of at least one portion of the lighting (20) causing specularities in the direction of the sensor(s) by the first projector and/or by the second projector.

* * * * *